(12) United States Patent
Smith et al.

(10) Patent No.: US 10,591,681 B2
(45) Date of Patent: Mar. 17, 2020

(54) MULTICHANNEL FIBER OPTIC CONNECTOR, ADAPTER, AND CONTACT RETENTION METHOD

(71) Applicants: Daniel Matthew Smith, Westerly, RI (US); William Medearis Smith, Dedham, MA (US)

(72) Inventors: Daniel Matthew Smith, Westerly, RI (US); William Medearis Smith, Dedham, MA (US)

(73) Assignee: Nest Technical Services, Inc., Westerly, RI (US)

( * ) Notice: Subject to any disclaimer, the term of this patent is extended or adjusted under 35 U.S.C. 154(b) by 0 days.

(21) Appl. No.: 15/731,645

(22) Filed: Jul. 13, 2017

(65) Prior Publication Data

US 2019/0018204 A1 Jan. 17, 2019

(51) Int. Cl.
*G02B 6/38* (2006.01)
*G02B 6/44* (2006.01)

(52) U.S. Cl.
CPC ......... *G02B 6/3897* (2013.01); *G02B 6/3874* (2013.01); *G02B 6/4452* (2013.01); *G02B 6/4471* (2013.01)

(58) Field of Classification Search
CPC .. G02B 6/3897; G02B 6/4452; G02B 6/3874; G02B 6/4471
See application file for complete search history.

(56) References Cited

U.S. PATENT DOCUMENTS

| 4,353,619 | A | * | 10/1982 | Parr | G02B 6/3806 |
| | | | | | 385/64 |
| 4,960,317 | A | * | 10/1990 | Briggs | G02B 6/3825 |
| | | | | | 385/56 |

(Continued)

FOREIGN PATENT DOCUMENTS

DE 19539552 A1 * 4/1997 ............. H01R 4/646

OTHER PUBLICATIONS

MIL-PRF-29504, Termini, Fiber Optic Connector, Removable, General Specification for, Revision B Notice 1, Dec. 27, 2007, Department of Defense, USA.

(Continued)

*Primary Examiner* — Ellen E Kim

(57) ABSTRACT

The multichannel fiber optic connector, adapter, and contact retention method is disclosed. The connector includes a load carousel which enables handling, locating, retention, and, where needed, spring-loading of the plurality of single-fiber fiber optic ferrules supported within the connector, and the connector itself provides for independent axial and radial alignment of the fiber optic contacts. The adapter includes a plurality of optical alignment sleeves, and mating interfaces for two different connector types on differing sides of the adapter, wherein the fiber count of one connector type is an integral multiple of the fiber count of the other connector type, and wherein the contact pattern of the first connector type is repeated the same integral number of times within the contact pattern of the second connector type. The contact retention method is achieved by means of a load carousel, (Continued)

which provides a devoted location for each of the plurality of single-fiber fiber optic ferrules it supports, and which, when necessary, provides an independent spring member for each ferrule, and which allows both terminated and unterminated ferrules to be assembled therein, and which further enables assembly into a connector or connector housing.

11 Claims, 8 Drawing Sheets

(56) References Cited

U.S. PATENT DOCUMENTS

| | | | | |
|---|---|---|---|---|
| 5,166,995 A * | 11/1992 | Briggs | ............... | G02B 6/3807 |
| | | | | 385/58 |
| 5,177,557 A | 1/1993 | Yamane | | |
| 5,381,498 A | 1/1995 | Bylander | | |
| 5,548,675 A | 8/1996 | Shigematsu et al. | | |
| 5,828,805 A | 10/1998 | Morlion et al. | | |
| 5,937,121 A * | 8/1999 | Ott | ............... | G02B 6/3825 |
| | | | | 385/59 |
| 6,085,003 A | 7/2000 | Knight | | |
| 6,249,636 B1 * | 6/2001 | Daoud | ............... | G02B 6/4471 |
| | | | | 385/135 |
| 6,259,851 B1 * | 7/2001 | Daoud | ............... | G02B 6/3801 |
| | | | | 174/74 R |
| 6,302,591 B1 * | 10/2001 | Nagaoka | ............... | G02B 6/3869 |
| | | | | 385/59 |
| 6,379,054 B2 | 4/2002 | Throckmorton et al. | | |
| 6,382,839 B1 * | 5/2002 | Eguchi | ............... | G02B 6/3821 |
| | | | | 385/56 |
| 6,483,980 B1 * | 11/2002 | Wu | ............... | G02B 6/2938 |
| | | | | 385/137 |
| 6,817,778 B2 | 11/2004 | Kang et al. | | |
| 7,651,278 B2 * | 1/2010 | Kiani | ............... | G02B 6/3825 |
| | | | | 385/71 |
| 7,871,203 B2 * | 1/2011 | Iwaya | ............... | G02B 6/3879 |
| | | | | 385/55 |
| 8,224,144 B2 * | 7/2012 | Allen | ............... | G02B 6/3849 |
| | | | | 385/135 |
| 8,254,742 B2 * | 8/2012 | Womack | ............... | G02B 6/4471 |
| | | | | 385/134 |
| 8,690,593 B2 * | 4/2014 | Anderson | ............... | G02B 6/3825 |
| | | | | 439/326 |
| 8,834,037 B2 | 9/2014 | Wouters | | |
| 8,992,097 B2 * | 3/2015 | Koreeda | ............... | G02B 6/381 |
| | | | | 385/78 |
| 9,207,422 B2 * | 12/2015 | Ray | ............... | G02B 6/4454 |
| 9,207,454 B1 * | 12/2015 | Bakhmutsky | ............... | G02B 6/4452 |
| 9,494,744 B2 * | 11/2016 | de Jong | ............... | G02B 6/3879 |
| 9,507,098 B2 | 11/2016 | Fabian et al. | | |
| 2004/0013370 A1 * | 1/2004 | Gerhard | ............... | B08B 3/02 |
| | | | | 385/85 |
| 2005/0135753 A1 * | 6/2005 | Eigenmann | ............... | G02B 6/3825 |
| | | | | 385/59 |
| 2007/0177843 A1 * | 8/2007 | Beck | ............... | G02B 6/3831 |
| | | | | 385/59 |
| 2008/0298764 A1 * | 12/2008 | Bloodworth | ............... | G02B 6/3897 |
| | | | | 385/135 |
| 2009/0257722 A1 * | 10/2009 | Fisher | ............... | G02B 6/3878 |
| | | | | 385/115 |
| 2010/0247040 A1 * | 9/2010 | Kuriki | ............... | G02B 6/3821 |
| | | | | 385/72 |
| 2011/0116748 A1 * | 5/2011 | Smrha | ............... | 385/76 |
| 2018/0128992 A1 * | 5/2018 | Li | ............... | G02B 6/3874 |

OTHER PUBLICATIONS

MIL-DTL-38999. Connectors, Electrical, Circular, Miniature, High Density, Quick Disconnect, Revision M Amendment 1, Jan. 26, 2017, Department of Defense, USA.

MIL-DTL-5015, Connectors, Electrical, Circular Threaded, AN Type, General Specification for, Revision H Amendment 1, Aug. 12, 2008, Department of Defense, USA.

MIL-PRF-28876, Connectors, Fiber Optic, Circular, Plug and Rec Style, Multiple Removable Termini; General Specification for, Revision E, Oct. 4, 2004 Department of Defense.

TIA/ETA-604, Fiber Optic Connector Intermateability Standards (FOCIS), Initial Revision, Nov. 1, 1993, Telecommunications Industry Association, USA.

* cited by examiner

MULTICHANNEL FIBER OPTIC CONNECTOR, ADAPTER, AND CONTACT RETENTION METHOD

FIELD OF THE INVENTION

This invention relates to fiber optic connectors, adapters, and the means of retaining optical contacts therein.

BACKGROUND OF THE INVENTION

With the advent of smart devices, cloud computing, and the Internet of Things (IoT), the bandwidth demands placed upon data centers have increased in leaps and bounds. The reason for this is that mobile and cloud devices are really just terminals, dependent upon centralized data processing and memory capacity in order to deliver the requisite information to the end-user device whose size, cost, and internal computing capability would otherwise be too limited to perform its intended function(s). As bandwidth demands have increased, the demand for optical fiber transmission have likewise increased, not merely in terms of substitution for older copper technologies, but also in terms of quantity, density, and required optical performance.

To meet these demands, a host of different connector interfaces and technologies have been developed, with varying degrees of commercial success. In general, the fiber optic connectors in common use today fall into one of three categories: simplex/duplex connectors, multifiber ferrule connectors, and assembled termini connectors. For many of these connectors, the Telecommunications Industry Association ("TIA") has defined the mechanical interface requirements, dimensions, and tolerances by means of their Fiber Optic Connector Intermateability Standards (FOCIS).

Simplex/duplex connectors are based upon a single-fiber interface, utilizing a pair of optical ferrules, at least one of which is spring-loaded, along with an alignment sleeve to align these ferrules. A simplex connector contains one of these interfaces, whereas a duplex connector has two identical interfaces arranged side-by-side. Examples of this type include the LC, SC, and MU connectors. These connector types are simple, easy to use, easy to assemble and arrange, inexpensive, and generally offer high optical performance when terminated properly.

Multifiber ferrule connectors, like simplex/duplex connectors, utilize a pair of optical ferrules, at least one of which is spring-loaded, but instead of using an alignment sleeve, the ferrules themselves are gendered, a male ferrule having alignment pins which are accepted by the female ferrule. Further, where simplex/duplex connectors have only one optical fiber terminated within each ferrule, the multifiber ferrule holds an array of fibers within a single aligned interface. By far the most common implementation of this is the MPO connector, which arranges fibers in linear rows of up to twelve (12) fibers per row, and up to six (6) rows of fibers per connector. This creates a fiber contact density which is unrivaled by any other commercial fiber optic connector interface. However, because of the nature of the ferrule termination, termination and polarity options are very limited. Because the fibers are all tied together within a common interface, the precision required for adequate termination is much higher than simplex/duplex connections, and as such optical performance tends to be somewhat poorer, connector cost tends to be higher, or both. Rework and troubleshooting tends to be more difficult, as well, since a problem with one optical channel will by necessity require rework and/or replacement of all lines within the same connector. In particular, multi-row MPO connectors have proven very difficult to reliably manufacture and terminate to acceptable levels of optical performance, especially in singlemode applications which demand more precise fiber alignment.

The third connector type uses an assembled fiber optic terminus, which is a ferrule assembled to a number of related components to mimic the form of an electrical connector contact. Termini themselves are either male (mimicking pin contacts) or female (mimicking socket contacts), and generally allow a fiber optic connection to be substituted for an electrical one, or vice versa. These are common in military style connectors, and military specification MIL-PRF-29504 defines the physical and performance characteristics for the most common types, which are used both in hybrid electrical connectors such as those defined by MIL-DTL-38999 and MIL-DTL-5015, or devoted fiberoptic connectors such as those defined by MIL-DTL-28876. These connectors are robust and reliable, and easy to employ, but since they are based upon electrical contact design and spacing, this utility comes at the expense of the connector's optical channel density and capacity. These connectors are also quite expensive, and labor-intensive at high fiber counts, as each channel must be terminated individually.

At present, those designing connection arrangements for the data center are forced to choose a topology which utilize either simplex/duplex connectors, MPO connectors, or a combination of the two to establish the connections requisite to their respective systems. In general, simplex/duplex connectors are used for patching, while MPO connectors are more commonly employed with trunk and backbone cable assemblies, as the number of fibers within those cable assemblies is often too large for one- and two-fiber connectors to be practicable. This results in topologies which have more connection points than might otherwise be necessary, and polarity arrangements which are inherently inflexible. Since connections are often the primary source of optical insertion loss, the very presence of an MPO connection can endanger loss budgets which are becoming tighter with every passing year. The need for a more flexible multifiber connector solution becomes clear.

SUMMARY OF THE INVENTION

Embodiments of the inventive multichannel fiber optic connectors, adapters, and contact retention methods described herein overcome the disadvantages of previous fiber optic connectors and adapters, and eliminate several important limitations thereof.

In accordance with one embodiment of the invention, there is provided a fiber optic contact load carousel, which accepts a plurality of single-fiber fiber optic ferrules, of the same or similar construction to those used in present simplex and duplex connectors. The load carousel provides a ferrule holder for holding each ferrule, the ferrule holder featuring a slotted passage to enable the ferrule held to be either terminated or unterminated at the time it is assembled into the load carousel. In those particular instances where springloading of the ferrules is required, the load carousel also provides an independent spring action for each ferrule loaded therein. The load carousel also provides geometry for snap-in or captive assembly within a connector housing.

In accordance with another embodiment of the invention, there is provided a connector assembly comprising a housing, a load carousel, and a plurality of single-fiber fiber optic ferrules, wherein each ferrule is allowed a degree of radial and axial freedom of movement independent of all other ferrules within the same connector. The connector as assembled may be assembled using ferrules which are already polished, or the ferrules can be gang-polished simultaneously after being assembled into the connector.

In accordance with another embodiment of the invention, there is provided a fiber optic connector adapter, designed to accept two different male multifiber connector interfaces, wherein the number of fibers supported by the first interface is evenly subdivided by the number of fibers supported by the second interface, and wherein the fiber arrangement of the first interface is comprised of a set of contact patterns concurrent with the fiber arrangement of the second interface, so that a plurality of connectors of the second interface can be mated directly to a single connector of the first interface. The adapter shall contain optical alignment sleeves for all supported connectors.

BRIEF DESCRIPTION OF THE DRAWINGS

Other aspects and advantages of the invention will be apparent from the following detailed description wherein reference is made to the accompanying drawings. In order that the invention may be more fully understood, the following figures are provided by way of illustration, in which.

DETAILED DESCRIPTION OF THE INVENTION

Figure 1A:
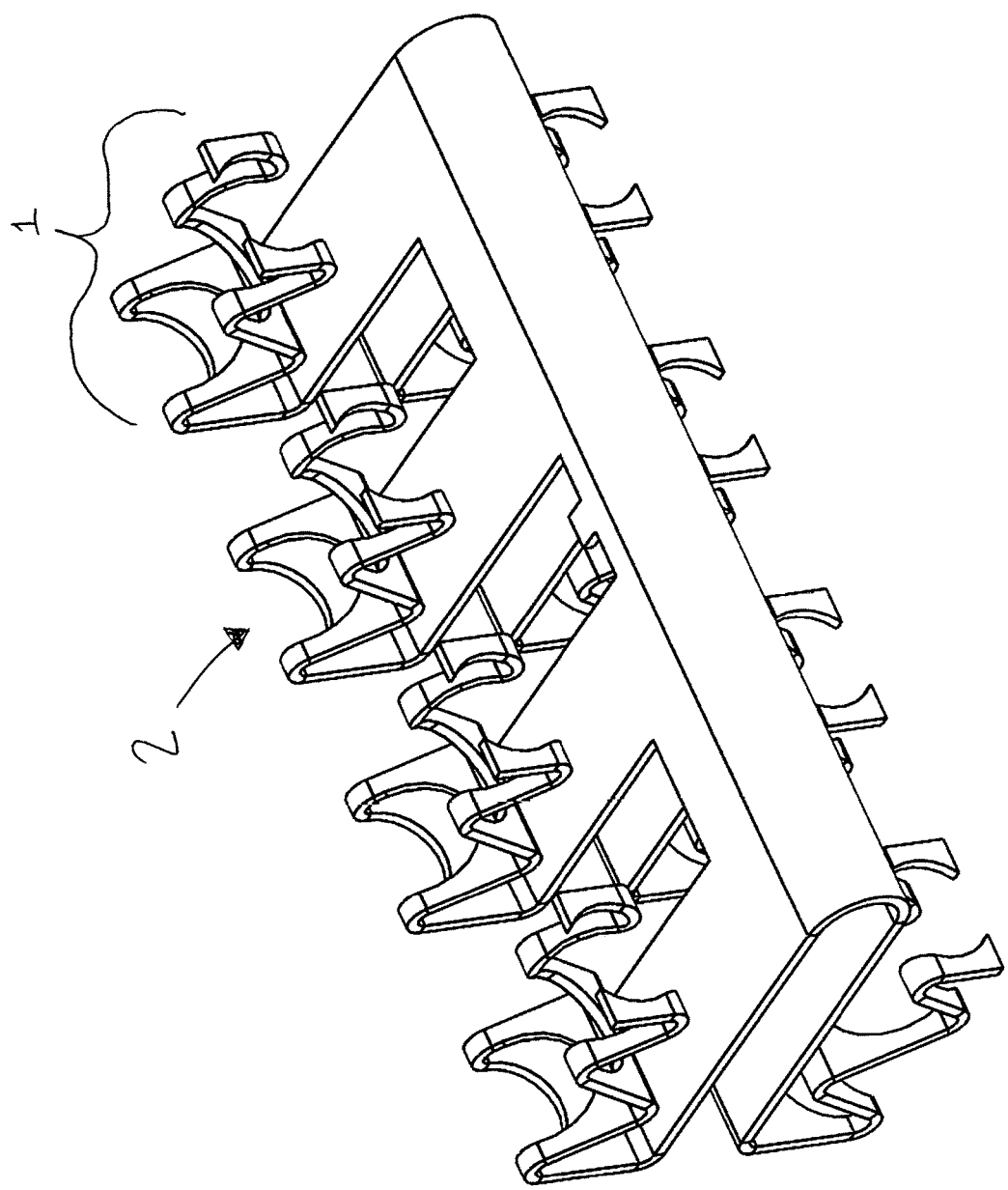
FIG. 1a is a view of the load carousel, whereby the supported ferrules shall be spring-loaded, executed as a single-piece metal stamping according to an embodiment of the invention.

FIG. 1a demonstrates a single metal stamping designed to accept and arrange up to eight (8) fiber optic ferrules, each of which will be spring loaded by means of its own devoted spring member 1, which also functions as a ferrule holder according to one embodiment of the invention. Each spring member has a slotted passage 2 which enables the requisite ferrule to be snapped into place, providing clearance for an optical fiber in the event that the ferrules are already terminated. Ferrules can be swapped from one contact position to another, enabling rearrangement, repair, or substitution of the optical lines supported thereby on an as-needed basis. The resultant load carousel, once loaded, could then be assembled into a connector housing.

Figure 1B:
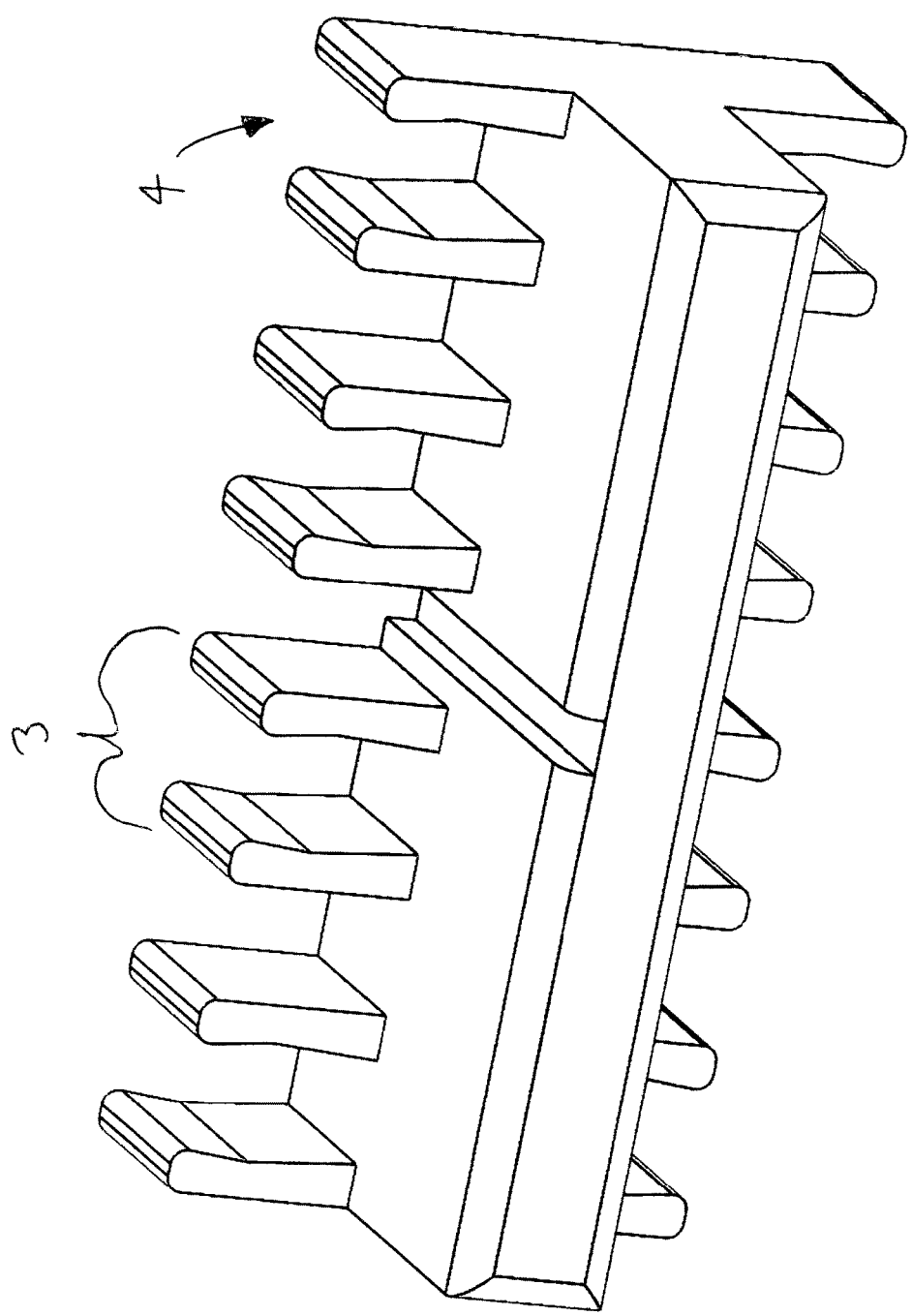
FIG. 1b is a view of the load carousel, whereby the supported ferrules shall not be spring loaded, executed as a single component which may be molded, cast, or machined according to a second embodiment of the invention.

FIG. 1b illustrates a formed, fixed component designed to accept and arrange up to eight (8) fiber optic ferrules, none of which will be spring loaded, according to an embodiment of the invention. There is a devoted ferrule holder 3 designed to accept each of the ferrules, each of which has a slotted passage 4 to provide clearance for an optical fiber in the event that the ferrules are already terminated. Ferrules can be swapped from one contact position to another, enabling rearrangement, repair, or substitution of the optical lines supported thereby on an as-needed basis. The resultant load carousel, once loaded, could then be assembled into a connector housing.

Figure 1C:
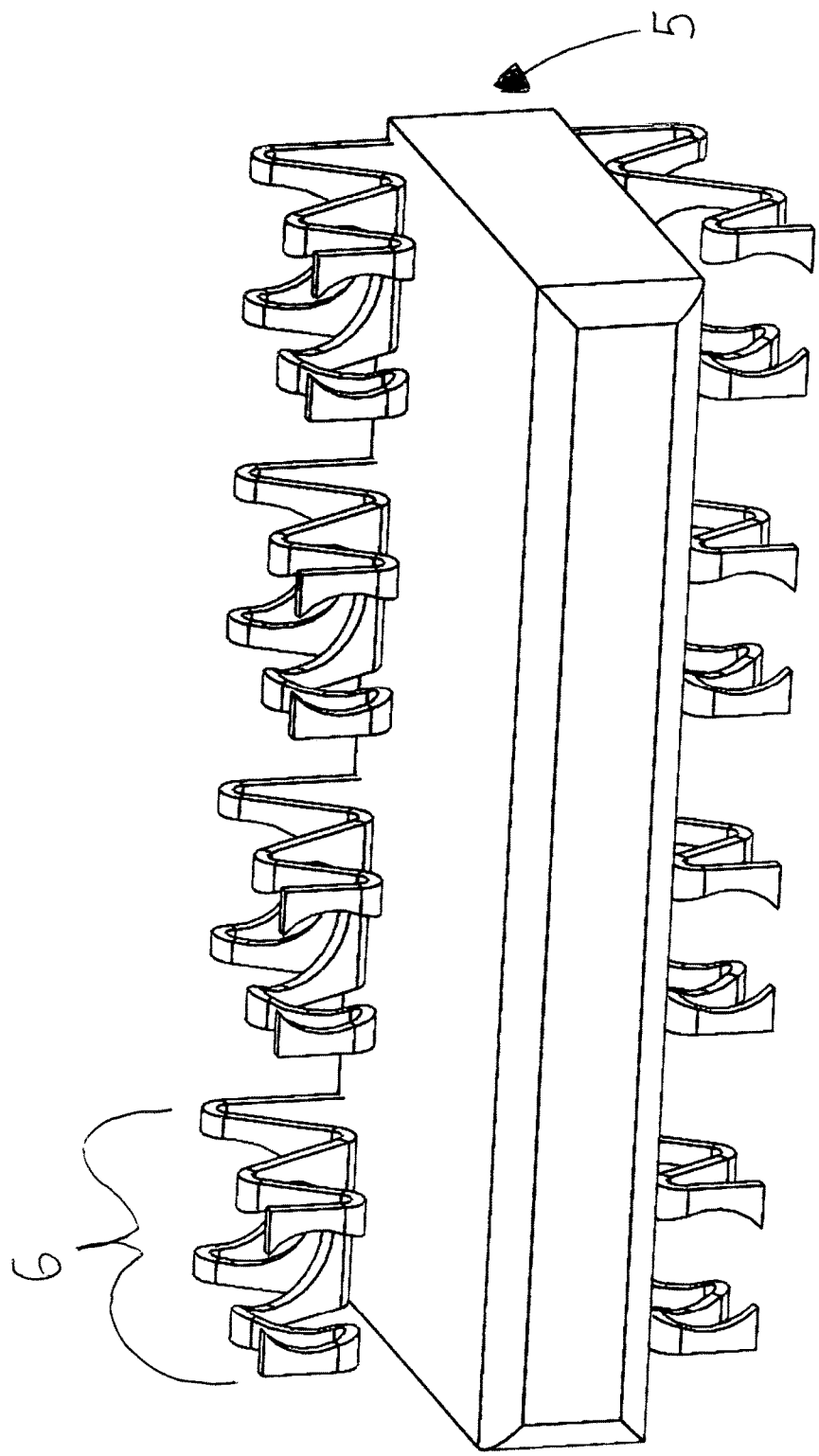
FIG. 1c is a view of the load carousel, whereby the supported ferrules shall be spring-loaded, executed as an assembly of individual stamped spring components onto a fixed component which may be molded, cast, or machined according to a third embodiment of the invention.

FIG. 1c illustrates a load carousel, according to another embodiment of the invention, in which a formed, fixed component 5 is combined with a set of stamped metal springs 6 to provide the same functionality as the single metal stamping shown in FIG. 1a. The metal springs 6 also function as ferrule holders. A slotted passage is provided in both the formed part and the stamped spring to provide clearance for an optical fiber in the event that the ferrules are already terminated. Ferrules can be swapped from one contact position to another, enabling rearrangement, repair, or substitution of the optical lines supported thereby on an as-needed basis. The resultant load carousel, once loaded, could then be assembled into a connector housing.

It must be noted that the load carousel in FIG. 1c can also be executed with ordinary coil compression springs, instead of the slotted stamped springs shown. However, this embodiment of the invention has the drawback that the springs must be loaded onto the optical fibers prior to termination, whereas a slotted spring can be assembled independent of the termination process.

Figure 2A:
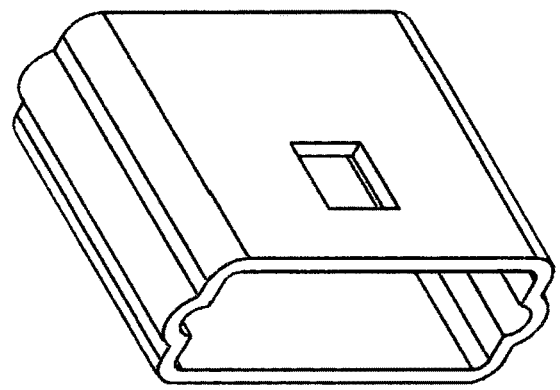
FIG. 2a is an exploded view of a male connector supporting two (2) optical fibers, containing a load carousel for its two (2) fiber optic ferrules, according to another embodiment of the invention.
Figure 2A:
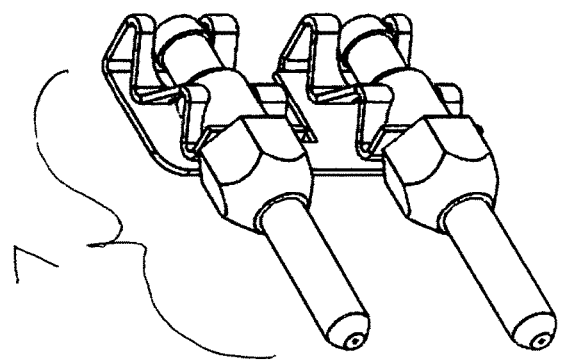
Figure 2A:
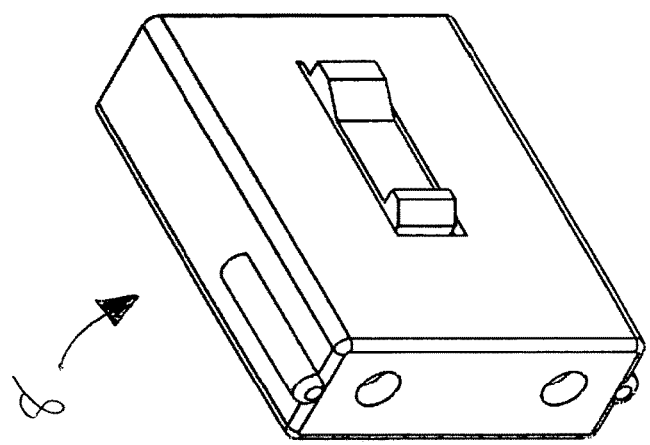

By utilizing a load carousel 7 inside a connector housing 8, according to an embodiment of the present invention, a multifiber connector can be produced which achieves a much higher fiber density than a simplex or duplex connector using the same ferrule technology. Such a connector would be freely reconfigurable, and capable of being gang-polished, making it more cost effective, design flexible, and spatially efficient than the simplex/duplex connectors it is intended to replace, even in a two-fiber arrangement such as that shown in FIG. 2a.

While the fiber density for a connector according to an embodiment of the present invention would not be quite as great as an MPO connector, it would have a number of advantages over an MPO which would compensate for the additional area of the connector footprint. The eight-fiber connector illustrated in FIG. 2b would, according to an embodiment of the present invention, offer a fiber density roughly half as good as a 12-fiber MPO, which is the most common type in present use. However, because the inventive connector retains independent radial and axial alignment of each contact position, its optical performance would be equivalent to that of a simplex or duplex connector, and thus enable higher quality communications per channel than would be possible with an equal number of MPO connections, whose optical performance tends to be poorer than simplex/duplex connectors. Moreover, since the dominant protocols for fiber optic data transmission call for fibers in multiples of eight rather than multiples of twelve, for the connector described in FIG. 2b the effective disadvantage in fiber density, in comparison to an MPO, is not as great as might be implied by its respective fiber count.

Figure 2B:
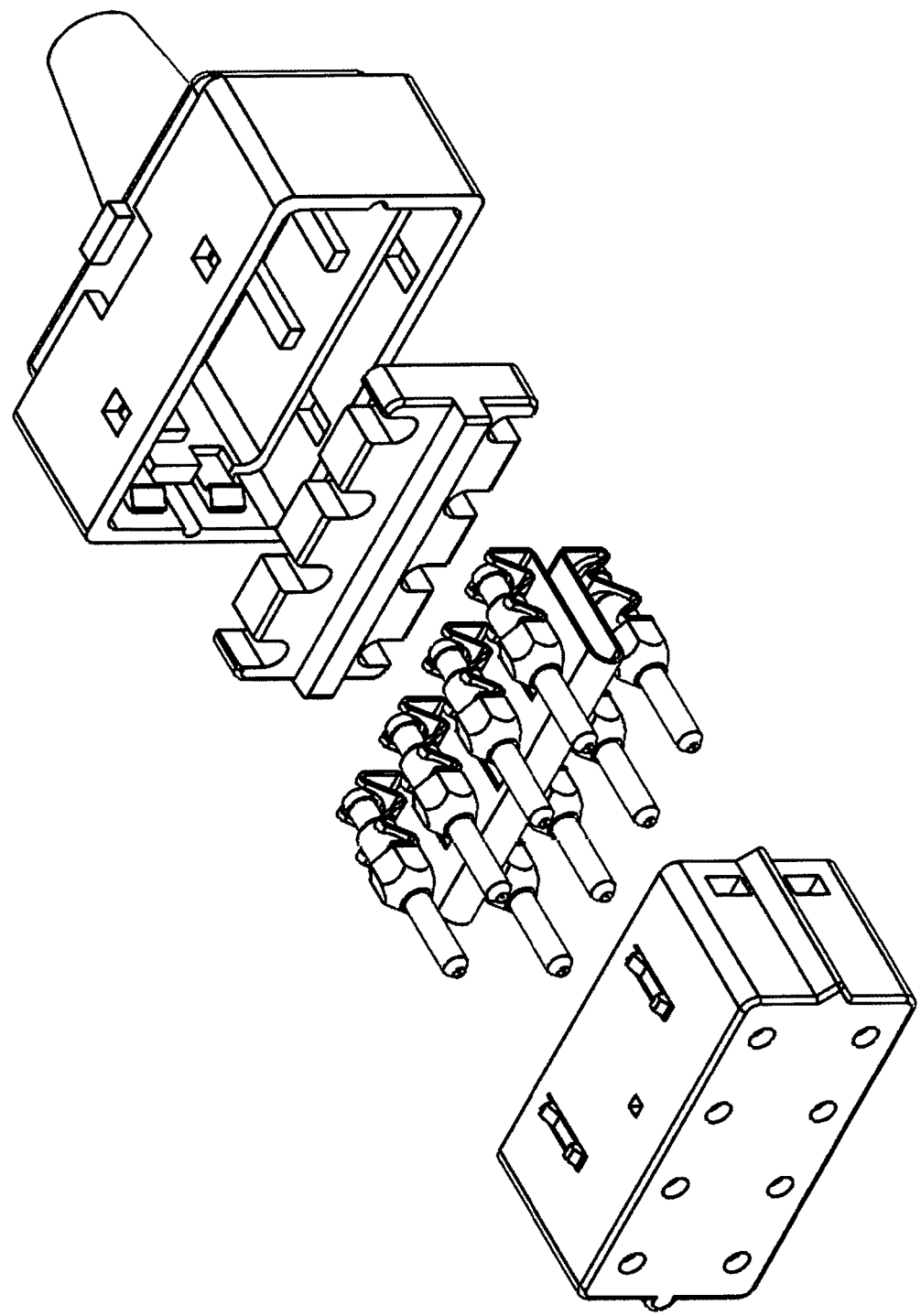
FIG. 2b is an exploded view of a male connector supporting eight (8) optical fibers, containing a load carousel for its eight (8) fiber optic ferrules, according to another embodiment of the invention.

More importantly, whereas an MPO connector is limited in terms of the fiber contact locations and routing offered, and extremely difficult to terminate or repair in the field, the connector shown in FIG. 2b can be "wired" in any contact configuration, reconfigured as needed, terminated using the same proven techniques as are employed in simplex/duplex applications, and repaired one channel at a time, in the event that a particular channel requires repair.

Figure 3:
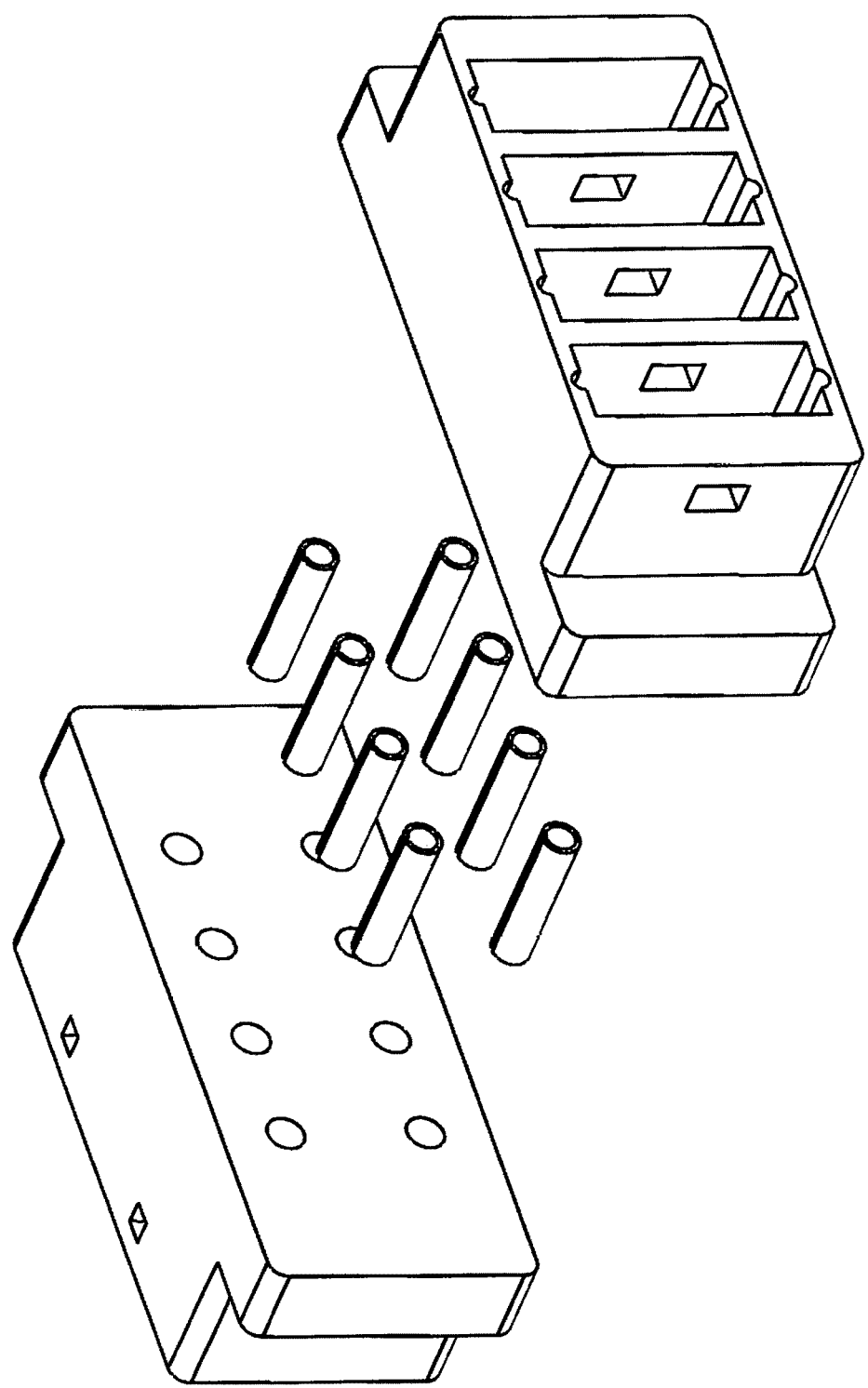
FIG. 3 is an exploded view of a fiber optic adapter, designed to mate four (4) of the connectors described in FIG. 2a directly to one (1) of the connectors described in FIG. 2b.

The adapter shown in FIG. 3, according to another embodiment of the invention, provides an additional means by which overall optical line performance and flexibility can be enhanced. This adapter enables the transition of fiber channels from 8-fiber groups on the trunk or backbone cable onto a twin-fiber patching panel in a single connection, without the need for intervening cassettes or cable harnesses.

EXAMPLE

The present invention may be best understood in view of the following non-limiting example, in which various embodiments of the invention described herein are substituted for existing standard connector technologies in a common fiber optic topology.

Figure 4A:
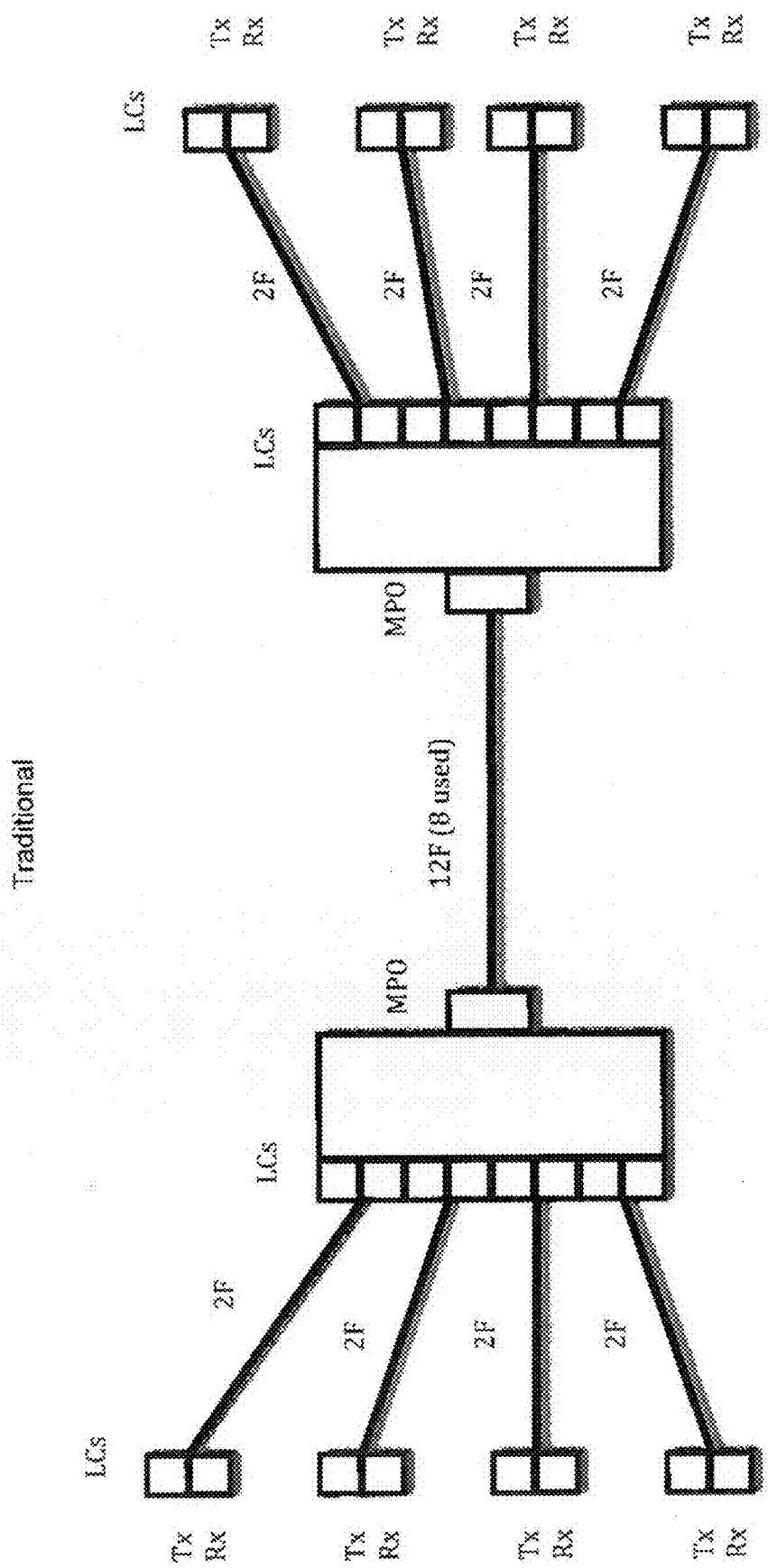
FIG. 4a illustrates a common end-to-end topology utilizing a trunk cable terminated with MPO connectors, cassettes with an LC-to-MPO transition, and duplex LC patch cords.
Figure 4B:
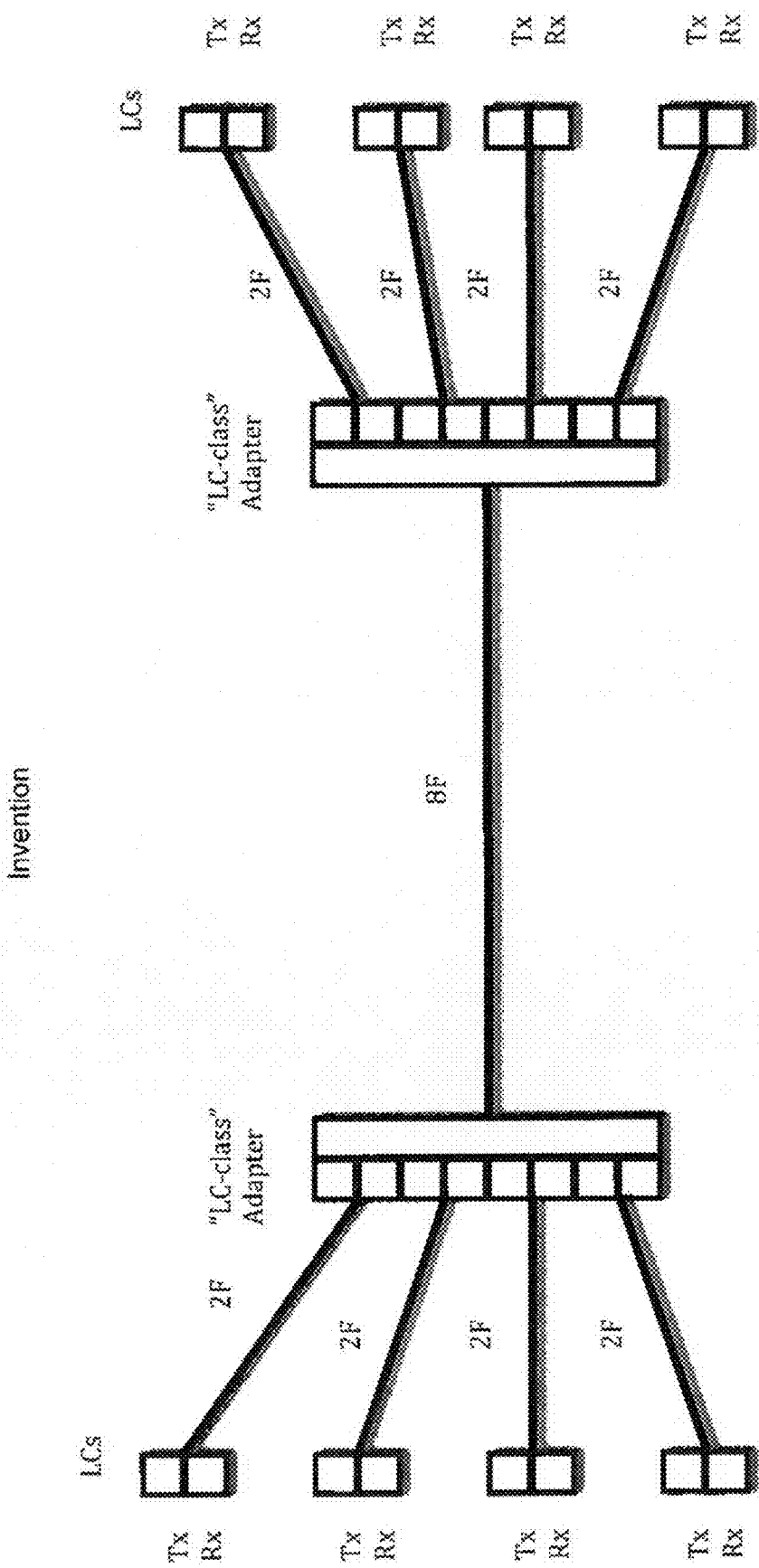
FIG. 4b illustrates an end-to-end topology which is functionally equivalent to that shown in FIG. 4a, utilizing various embodiments of the present invention, including the connectors illustrated in FIG. 2a and FIG. 2b, and the adapter illustrated in FIG. 3.

Present topologies which utilize MPO connectors for the trunk cables and simplex/duplex connectors on the individual switches or other optical communication devices require a devoted component to transition between one connector type and another, as shown schematically in FIG. 4a. By utilizing the adapter of FIG. 3, with each adapter mating four twin-fiber connectors, such as those shown in FIG. 2a to a single 8-fiber connector such as that shown in FIG. 2b, a functionally equivalent topology can be created as shown in FIG. 4b. Two-fiber patch cords are arranged freely and directly mated to eight-fiber groups terminated on the trunk cables. Two connections are eliminated from the topology with no loss of functionality or versatility, and the connections which are eliminated thereby are the lower-performance MPO connections. The insertion loss associated with those two eliminated connections can therefore be added to the system's loss budget, enabling greater data performance than might otherwise be possible. Further, while the 8-fiber connector of FIG. 2b occupies a greater area footprint than a 12-fiber MPO, the LC-to-MPO transition cassettes or harnesses eliminated are more voluminous than the adapter they are replaced by, which means that much less rack and cabinet space is occupied overall when the entirety of the topology is considered.

In multimode fiber applications, the most common commercial products presently achieve what is referred to as "Tier 3" performance, in which LC or other simplex connections are expected to achieve insertion loss of no more than 0.15 dB, and MPO connections are expected to achieve insertion loss of no more than 0.35 dB. In singlemode applications, the common standard is "Tier 1", where LC/simplex and MPO connections are expected to achieve 0.30 dB and 0.75 dB, respectively. The topology of FIG. 4a requires six connections, 4 LCs and 2 MPOs, which would imply maximum connector insertion loss of 1.30 dB for multimode applications, and 2.70 dB for singlemode. By applying the invention, the topology of FIG. 4b achieves the same functionality with just four connections, all of which are "LC-class", resulting in maximum connector loss of just 0.60 dB for multimode, and 1.20 dB for singlemode. By eliminating the two MPO connections, connector insertion loss is reduced by more than 50%. This lower loss enables data transmission rates and/or transmission distances to be increased per transmit-receive fiber pair.

Additionally, because the connectors which are embodiments of the present invention are themselves reconfigurable, the resultant topology of FIG. 4b is itself even more flexible than one which utilizes duplex connectors exclusively. In other words, for applications which require transition from 8-fiber groups to fiber pairs, such as is common with transmit-receive pairs, the present invention enables more compact and higher performance solutions to be produced at lower cost than current connector technologies would allow.

What is claimed is:

1. A fiber optic contact load carousel, comprised of the following:
   a plurality of ferrule holders for single-fiber fiber optic ferrules, each ferrule holder of the plurality of ferrule holders comprising of a surface upon which the rear surface of a ferrule shoulder of each single-fiber fiber optic ferrule shall rest, a passage within which the body of the ferrule shall be securely retained, and a slot to enable passage of an optical fiber terminated to the ferrule retained, each ferrule holder retaining one single-fiber fiber optic ferrule only, and with no surface, passage or slot being shared by more than one ferrule holder, whereby each fiber optic contact position is afforded axial alignment and radial alignment which is independent of all other contact positions, so that the motion of one ferrule in response to the imperfection of the mating interface shall neither drive nor restrict the motion of any other ferrule; and
   the capability, when fully loaded with ferrules in the unmated condition, to be assembled into a connector housing.

2. The fiber optic contact load carousel of claim 1, wherein the load carousel is a metal stamping.

3. The fiber optic contact load carousel of claim 2, wherein the ferrule holder for each single-fiber fiber optic ferrule includes a spring member, wherein the compression of each spring member is independent of all other spring members.

4. The fiber optic contact load carousel of claim 1, wherein the load carousel is a formed, fixed component, which is manufactured by means of molding, casting, or machining.

5. The fiber optic contact load carousel of claim 4, wherein a separate spring is assembled to the fixed component for each fiber optic contact position.

6. The fiber optic contact load carousel of claim 4, wherein the spring component or components are separate inserts integrally molded within a molding or casting.

7. A connector assembly, which includes within its construction a fiber optic contact load carousel in accordance with claim 1, whereby each single-fiber fiber optic ferrule is afforded spring loading, axial alignment, and radial alignment which is independent of all other single-fiber fiber optic ferrules, so that the motion of one single-fiber fiber optic ferrule in response to the imperfection of the mating interface shall neither drive nor restrict the motion of any other single-fiber fiber optic ferrule.

8. The connector assembly of claim 7, whereby all of the optical fibers contained therein are capable of being gang-polished after being assembled into the connector assembly and secured within their respective single-fiber fiber optic ferrules.

9. A fiber optic adapter, comprised of the following:
a first interface geometry to accept a plurality of connectors of a first interface type; and
a second interface geometry to accept a single connector of a second interface type whose ferrules are arrayed in a pattern whereby the alignment axes of the ferrules are not coplanar, where the number of fibers supported within the second interface type is an integral multiple of the number of fibers supported within the first interface type, and where the contact pattern of the first interface type is repeated the same integral number of times within the second interface type, the fiber optic adapter itself aligning and mating the connectors of the first interface type directly to the connector of the second interface type by means of optical alignment sleeves.

10. The fiber optic adapter of claim 9, whereby a plurality of connectors of the second interface type are supported, and whereby the requisite pattern of connectors of the first interface type is repeated a number of times equal to the number of connectors of the second interface type which are supported by the fiber optic adapter.

11. A fiber optic interconnection system, comprised of the following:
A fiber optic adapter comprised of a first interface geometry to accept a plurality of connectors of a first interface type; and a second interface geometry to accept a single connector of a second interface type whose single-fiber fiber optic ferrules are arrayed in a pattern whereby the central axes of the single-fiber fiber optic ferrules are not coplanar; and
A plurality of connectors of the first interface type; and
A connector of the second interface mated directly to all of the connectors of the first interface type through the fiber optic adapter, whereby each mated pair of single-fiber fiber optic ferrules is afforded spring loading, axial alignment, and radial alignment which is independent of all other mated pairs of single-fiber fiber optic ferrules, so that the motion of one mated pair of single-fiber fiber optic ferrules in response to the imperfection of the mating interfaces shall neither drive nor restrict the motion of any other single-fiber fiber optic ferrule.

* * * * *